US009585516B2

(12) United States Patent
Harding

(10) Patent No.: US 9,585,516 B2
(45) Date of Patent: Mar. 7, 2017

(54) COOKING POT LID WITH AUTOMATED STIRRING ELEMENTS, LID FOR COOKING VESSEL, AND COOKING VESSEL SYSTEM INCLUDING SAME

(71) Applicant: Nicole Harding, Houston, TX (US)

(72) Inventor: Nicole Harding, Houston, TX (US)

( * ) Notice: Subject to any disclaimer, the term of this patent is extended or adjusted under 35 U.S.C. 154(b) by 18 days.

(21) Appl. No.: 14/503,952

(22) Filed: Oct. 1, 2014

(65) Prior Publication Data

US 2015/0090716 A1    Apr. 2, 2015

Related U.S. Application Data

(60) Provisional application No. 61/885,273, filed on Oct. 1, 2013.

(51) Int. Cl.
*A47J 36/16* (2006.01)
*A47J 36/06* (2006.01)

(52) U.S. Cl.
CPC .......... *A47J 36/165* (2013.01); *A47J 36/06* (2013.01)

(58) Field of Classification Search
CPC .................. A47J 36/06; A47J 36/165
USPC .................................. 366/242–260
See application file for complete search history.

(56) References Cited

U.S. PATENT DOCUMENTS

| | | | | |
|---|---|---|---|---|
| 364,622 A * | 6/1887 | Zies | ............... | B01F 7/30 366/288 |
| 1,479,584 A * | 1/1924 | Conklin | ............... | A47J 36/165 366/288 |
| 2,719,703 A * | 10/1955 | Boakes | ............... | A47J 36/165 366/244 |
| 3,151,847 A * | 10/1964 | Broomall | ............... | B01F 7/1605 366/287 |
| 3,482,823 A * | 12/1969 | Rechtin | ............... | B01F 7/30 366/245 |
| 4,079,917 A * | 3/1978 | Popeil | ............... | A47J 43/082 366/244 |
| 4,453,831 A * | 6/1984 | Mahon | ............... | B28C 5/168 366/244 |
| 4,697,929 A * | 10/1987 | Muller | ............... | B01F 7/30 366/100 |
| 5,013,158 A * | 5/1991 | Tarlow | ............... | A47J 36/165 366/251 |
| 5,028,141 A * | 7/1991 | Stiegelmann | ..... | B01F 15/00922 366/245 |
| 5,201,263 A * | 4/1993 | Teng | ............... | A47J 36/165 366/130 |
| 5,372,422 A * | 12/1994 | Dubroy | ............... | A47J 36/165 366/143 |
| 5,516,208 A * | 5/1996 | Givant | ............... | A47J 36/165 366/251 |
| 5,711,602 A * | 1/1998 | Rohring | ............... | A47J 36/165 366/251 |
| 5,765,947 A * | 6/1998 | Dubroy | ............... | A47J 36/165 366/143 |
| 5,816,136 A * | 10/1998 | Stallings | ............... | A47J 36/165 366/251 |
| 6,032,571 A * | 3/2000 | Brous | ............... | C12C 13/10 366/249 |
| 6,113,258 A * | 9/2000 | Ardent | ............... | A47J 36/165 366/282 |

(Continued)

*Primary Examiner* — Tony G Soohoo
(74) *Attorney, Agent, or Firm* — Hulsey, P.C.

(57) ABSTRACT

The invention is directed to a self-stirring cooking pot lid, featuring a plurality of electric stirring elements.

16 Claims, 3 Drawing Sheets

(56) References Cited

U.S. PATENT DOCUMENTS

| | | | | |
|---|---|---|---|---|
| 6,227,697 B1* | 5/2001 | Stahl | ............... | B01F 7/1665 |
| | | | | 366/288 |
| 6,286,990 B1* | 9/2001 | De Zuazo Torres | .. | A47J 36/165 |
| | | | | 366/282 |
| 6,510,704 B1* | 1/2003 | Russell | ............... | A23G 9/12 |
| | | | | 366/251 |
| 2006/0018187 A1* | 1/2006 | Donna | ............... | A47J 41/0027 |
| | | | | 366/129 |
| 2006/0158959 A1* | 7/2006 | Huang | ............... | A23G 9/08 |
| | | | | 366/251 |
| 2011/0011275 A1* | 1/2011 | Murray | ............... | A47J 36/165 |
| | | | | 99/348 |
| 2011/0058447 A1* | 3/2011 | Reif | ............... | B01F 7/1695 |
| | | | | 366/249 |
| 2012/0189745 A1* | 7/2012 | DeLong | ............... | A47J 36/165 |
| | | | | 426/231 |
| 2015/0068409 A1* | 3/2015 | Tanaka | ............... | A47J 27/004 |
| | | | | 99/348 |
| 2015/0090716 A1* | 4/2015 | Wilson | ............... | A47J 36/165 |
| | | | | 220/212 |

* cited by examiner

COOKING POT LID WITH AUTOMATED STIRRING ELEMENTS, LID FOR COOKING VESSEL, AND COOKING VESSEL SYSTEM INCLUDING SAME

CROSS-REFERENCE TO RELATED APPLICATIONS

This application is related and claims priority to Provisional Application 61/885,273 filed Oct. 1, 2013, which is hereby incorporated by reference.

FIELD OF THE INVENTION

The present disclosure generally relates to vessels for cooking.

BACKGROUND OF THE INVENTION

The invention relates generally to cooking vessels.

BRIEF SUMMARY OF THE INVENTION

The disclosure provides a lid for use with a cooking vessel such as a cooking pot, the lid including a plurality of automated stirring elements. The disclosure provides a system including a lid and cooking vessel as disclosed. In an embodiment, each stirring element can turn on a revolving and rotating platform mounted on the interior surface of the lid. In an embodiment, stirring elements can be rotated by a set of gears trained between an electric motor and a plurality of stirrer elements driven by the set of gears. The stirring elements can be driven by an electric motor, which may be powered by a battery or by household current. A small control panel and digital timer can be located on a handle of the lid.

Additional features and advantages of the invention will be set forth in the description which follows, and will be apparent from the description, or may be learned by practice of the subject matter. The foregoing general description and the following detailed description are exemplary and explanatory and are intended to provide further explanation of the subject matter.

These and other aspects of the disclosed subject matter, as well as additional novel features, will be apparent from the description provided herein. The intent of this summary is not to be a comprehensive description of the subject matter, but rather to provide a short overview of some of the subject matter's functionality. Other systems, methods, features and advantages here provided will become apparent to one with skill in the art upon examination of the accompanying drawings and detailed description. It is intended that all such additional systems, methods, features and advantages that are included within this description, be within the scope of any claims filed now or later.

BRIEF DESCRIPTION OF THE DRAWINGS

The accompanying drawings are included to provide a further understanding of the disclosed subject matter and are incorporated into and constitute a part of the specification. They illustrate one embodiment of disclosed subject matter and, together with the description, serve to explain principles of the subject matter to one of ordinary skill.

The novel features believed characteristic of the disclosed subject matter will be set forth in any claims that are filed later. The disclosed subject matter itself, however, as well as a preferred mode of use, further objectives, and advantages thereof, will best be understood by reference to the following detailed description of an illustrative embodiment when read in conjunction with the accompanying drawings, wherein:

DETAILED DESCRIPTION OF ILLUSTRATIVE EMBODIMENTS

Figure 1:
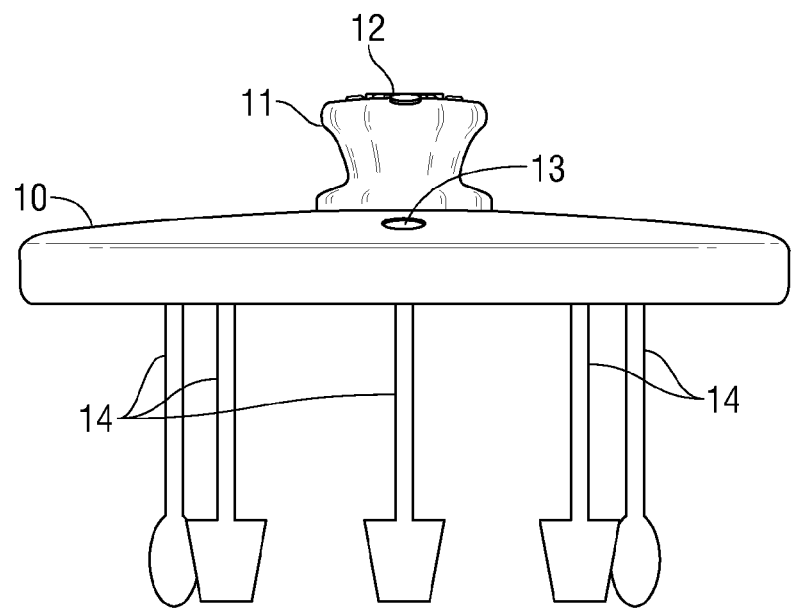
FIG. 1 depicts a side view illustrating a lid according to an embodiment.
Figure 2:
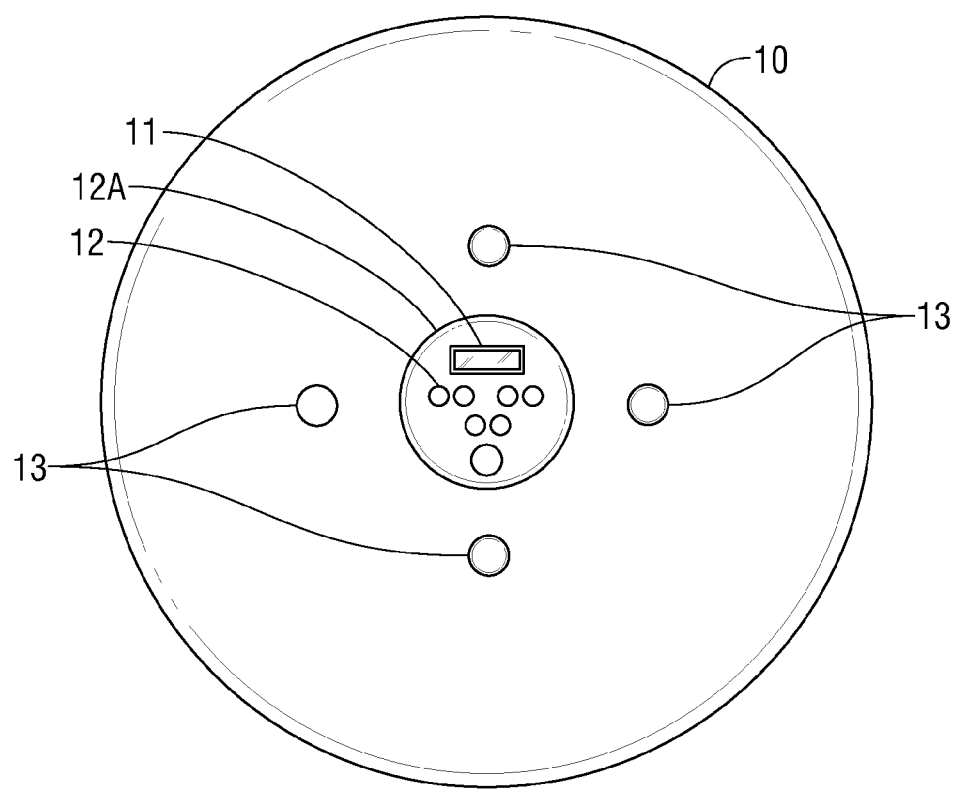
FIG. 2 depicts a top view of a lid according to an embodiment shown in FIG. 1.

Reference now should be made to the drawings, in which the same reference numbers are used throughout the different figures to designate the same components.

It will be understood that, although the terms first, second, third, etc. may be used herein to describe various elements, these elements should not be limited by these terms. These terms are only used to distinguish one element from another element. Thus, a first element discussed below could be termed a second element without departing from the teachings of the present disclosure.

Referring now to the invention in more detail, the invention is directed to a self-stirring cooking pot lid, featuring a plurality of electric stirring elements 14. Each stirring element 14 turns on a revolving and rotating platform mounted on the interior surface of the lid 10. The platform is driven by an electric motor, which may be powered by a battery or by household current. A small control panel 12 and digital timer 12 are located on the handle 11 of the lid 10.

FIG. 1 depicts an exemplary embodiment consists of a lid 10 for a cooking pot, skillet, or similar cookware, which is provided as a replacement lid, and provides a platform and supporting components for the stirring elements 14. An alternate embodiment, featuring a cooking pot, skillet, or set of cookware with self-stirring lids 10 and all the associated components, is also contemplated. All of these contemplated embodiments are provided in a broad variety of standard sizes, matching existing cookware sizes and configurations.

On the bottom surface of the lid 10 is a circular platform featuring a plurality of lower apertures, arranged symmetrically in a circle halfway between the center and the outer rim of the lid 10. Preferably, the platform will feature six or eight lower apertures. More or fewer lower apertures are also contemplated. Stirring elements 14 are inserted into the lower apertures and locked into position, using a mechanism which is well known to the art. Full sets of various stirring elements 14 matching the number of lower apertures, resembling stirring spoons, forks, or spatulas, are provided. Other types of stirring elements 14 are also contemplated.

The handle 11 features an electric motor, which propels a plurality of drive elements within the platform when fully assembled. The motor may be powered by ordinary house current (being supplied by way of a power cord), or by a battery or batteries contained within the lid 10. If the motor is powered by house current, the power cord may be removably attached to any component found on the lid 10 (or the lid 10 itself). The first several inches of the power cord may be contained within or supported by a metal coil or similar device, to elevate it above the upper surface of the lid 10 and protect it from heat damage during cooking. In another embodiment, a battery or batteries may be contained within the handle 11. In another embodiment, the power cord may be removably attached to the handle 11.

The handle 11, the platform, and the stirring elements 14 are removable for cleaning purposes. The platform features a removable lower splash plate which is fully submersible and dishwasher safe, enabling the user to clean the portion of the platform which may come into contact with the contents of the cooking pot or other cookware. All other components except the handle 11 are fully submersible and dishwasher safe. The upper surface of the lid 10 features an upper aperture 13, or a plurality of upper apertures 13, which may be opened and closed by turning the handle 11. The upper apertures 13 are separated from the handle 11 by a safe distance, and enable steam and other cooking vapors to be vented safely during the cooking process.

The stirring elements 14 feature flexible lower edges which are intended to abut against the bottom and lower sides of the interior surface of the cooking pot or other cookware when fully assembled. The stirring elements 14 may include a set of removable extensions to fit cookware of various depths.

The timer 12A may feature an optional thermometer (not pictured). The thermometer would be supported by a removable, dishwasher-safe sensor, extending downward in the form of a rod from the center of the platform. The thermometer and timer 12A may feature interactions with the motor. Such interactions may include such features as activating the stirring elements 14 when the contents of the cookware have reached a desired temperature, or activating and then deactivating the stirring elements 14 after selected periods of time have elapsed.

To use the first exemplary embodiment, the user prepares food in the cooking pot or other cookware, and places the cookware with its contents on the cooking surface. The user then assembles the lid 10, using the handle 11 and the platform. The user inserts the desired set, a mixed set, or a partial set of stirring elements 14 into the lower apertures as desired. The user then sets the speed of the stirring elements 14, and may elect to set the timer 12A, the thermometer, or both as desired. Finally, the user places the lid 10 on top of the cookware, such that the stirring elements 14 extend downward into the contents of the cookware, and may elect to open or close the upper apertures 13 by turning the handle 11. The user then activates the motor and the cooking surface.

The lid 10 is preferably manufactured from a rigid, durable material, such as aluminum, steel or stainless steel. The control panel 12, the timer 12A, the motor, the platform, and the thermometer are preferably manufactured from rigid, durable materials, such as aluminum, steel, stainless steel, and copper alloys. The handle 11 is preferably manufactured from a rigid, durable material with insulating properties, such as wood or high-density polymer. Interior surfaces of the lid 10 and the lower splash plate of the platform are preferably coated with a non-stick material which is easily cleaned, such as polytetrafluoroethylene. The power cord is preferably manufactured from copper wire sheathed in plastic.

Figure 4:
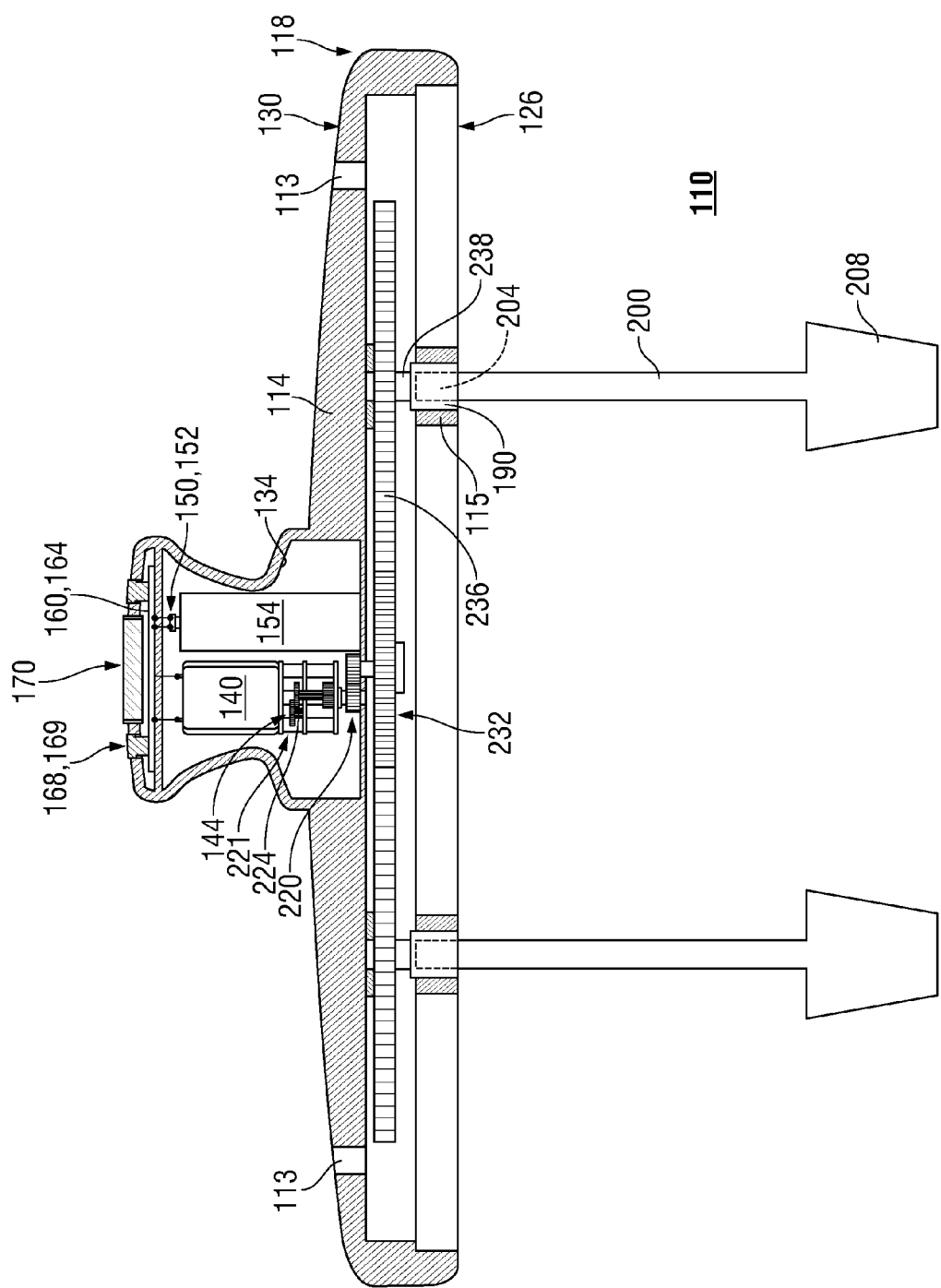
FIG. 4 depicts a partial cross-sectional view of a lid according to an embodiment.

According to an embodiment illustrated in FIG. 4, a lid 110 is configured for use with a cooking vessel (not shown), such as a cooking pot. The cooking vessel can have a flat bottom and an outer wall including a continuous upper lip tracing around in generally horizontal plane an upper circumference of the outer wall. It will be understood that the cooking vessel (not shown) has a vessel interior defined inside the outer wall. It will be understood that lid 110 can be identical to lid 10 except as otherwise described and illustrated herein.

Figure 3:
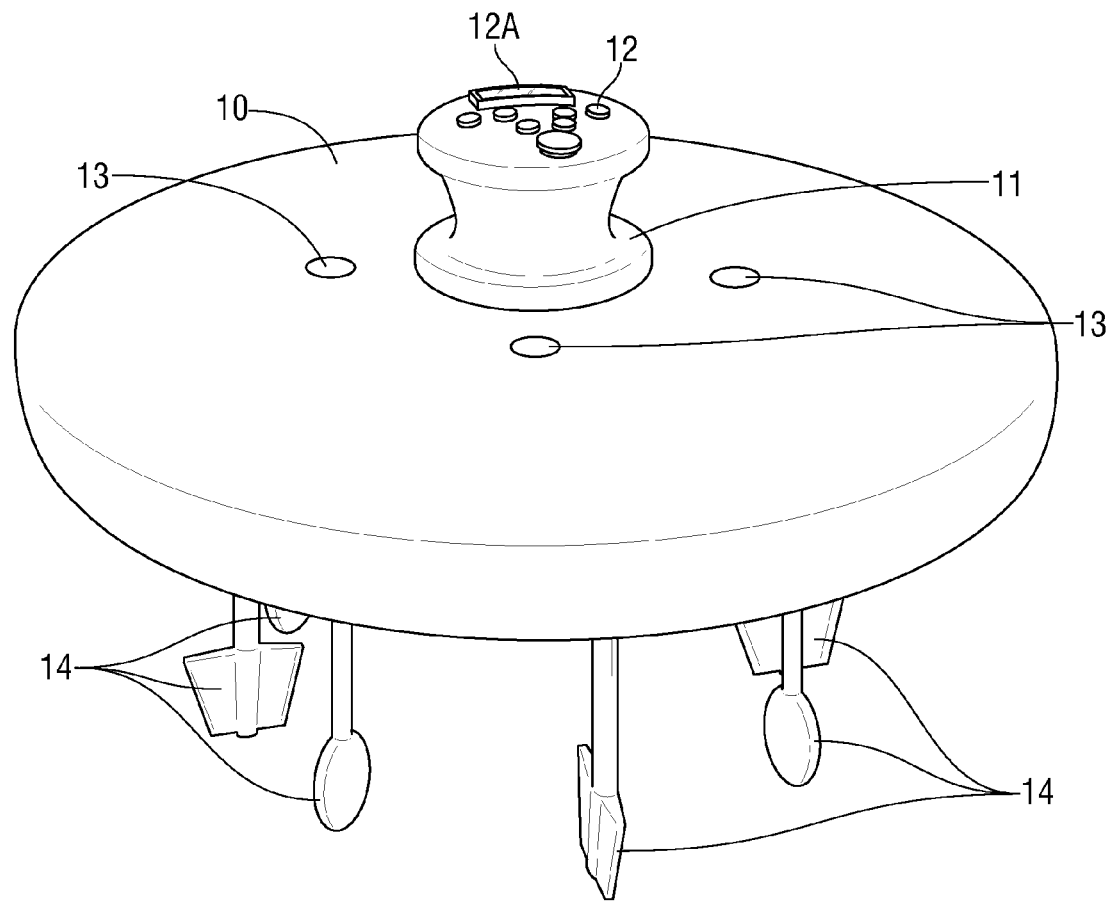
FIG. 3 depicts a top perspective view of a lid as shown in FIG. 2 according to an embodiment.

In an embodiment, lid 110 can include lid superstructure 114 having an outer peripheral portion 118 spaced from a central portion 122 thereof. Outer peripheral portion 118 is configured to rest on the upper lip (not shown) in seated relationship therewith. Referring to FIG. 3, the lid superstructure 114 has a bottom side 126 proximate the vessel interior (not shown). The lid superstructure 114 has a top side 130 that returns from the bottom side 126 in opposed relationship to same at the outer peripheral portion 118. The lid superstructure 114 has defined therein at least one cavity 134 intermediate the bottom side 126 and top side 130. The lid superstructure 114 can include a set of spaced apertures 113 each extending between the bottom side 126 and top side 130 for water vapor or steam to escape from the vessel interior through the lid 110 into the external environment. The apertures 113 are configured to prevent water vapor or moisture from entering the at least one cavity 134 in proximity to electrical components to prevent damage to same.

Lid 110 includes an electric motor 140 supported in the at least one cavity 134 in fixed relationship thereto. The electric motor 140 has a rotatable motor shaft 144. Any suitable electric motor can be used. In the particular arrangement illustrated in FIG. 3, electric motor 140 can be a Model GM13-030PA-06400 12V micro-electric motor. In an arrangement electric motor 140 can be commonly mounted with a suitable gearbox or gear transmission 228. In an arrangement illustrated in FIG. 4, gearbox or gear transmission 228 can be, for example, a 13 mm gearbox having any of the following reduction ratios (1/3, 1/10, 1/20, 1/35, 1/63, 1/86, 1/115, 1/150, 1/250, 1/360). A suitable electric motor 140 and gearbox 221 are available from TT Motor (Shenzhen) Industrial Co., Ltd. (Guangdong, China).

Lid 110 includes a power supply 150 configured to deliver electric current to electric motor 140 and at least one circuit 164 supported on a printed circuit board 160. Any suitable power supply can be used. In the arrangement illustrated in FIG. 3, power supply 150 includes a battery connector 152 housed in the at least one cavity 134. The battery connector 152 is configured for establishing an electrical connection with a suitable battery 154 replaceably positioned in the at least one cavity 134. In the arrangement shown in FIG. 3, battery 154 is a conventional 9 volt alkaline battery. In an arrangement (not shown) power supply 150 can include a suitable power cord in electrical communication with the at least one circuit 154, the power cord at an end thereof having a conventional plug configured to be received in a conventional wall outlet of a fixed building electrical system, such as a 110 volt system.

Lid 110 includes a printed circuit board 160 supported in the at least one cavity 134. The printed circuit board 160 includes the at least one electric circuit 164 configured to deliver current to the electric motor 140. The at least one electric circuit 164 is configured for selectively controlling operation of the electric motor 140. Lid 110 includes at least one control switch 168 supported by the printed circuit board 160 in fixed relation to lid superstructure 114. The at least one control switch 168 is connected to the at least one circuit 164 to enable manual control of at least one control parameter of the at least one circuit 164 for controlling current supplied and operation of the electric motor 140. It will be understood that the at least one control switch 168 can include, for example, at least one push-button control switch 169 connected to the at least one circuit 164 for incrementing the at least one control parameter. It will be understood that the at least one control parameter can include, for example, electric current supplied from the at least one circuit 164 to electric motor 140. In one arrangement, the at least one control parameter can include electric current supplied to electric motor 140 from a power supply 150 such as, for example, a battery connector 152.

Lid 110 includes a visual display 170 supported by the lid superstructure 114. The visual display 170 is connected to the at least one circuit 164 for displaying information about operation of at least one stirring element 180. In an embodiment, the visual display 170 is connected to the at least one circuit 164 for displaying information about operation of electric motor 140. It will be understood that displayed information can include, for example, display information changeable in relation to manipulation of the at least one control switch 168. In an embodiment, displayed information can include, for example, display information changeable in relation to changes of the at least one control parameter 166 such as, for example, electric current supplied to electric motor 140.

Lid 110 includes at least one stirrer seat 190 supported by the lid superstructure 114 in spaced relationship to the outer peripheral portion 118 for driven rotation relative to the lid superstructure 114. The at least one stirrer seat 190 is configured for driving engagement with respective of the at least one stirring element 200. Each of the at least one stirring element 200 can include a respective attachment end 204 disposed in spaced, opposed relationship to a respective stirring element 208. It will be understood that rotation rate of the at least one stirring element 200 can be controlled by controlling operation of electric motor 140. In an embodiment, the at least one stirrer seat 190 can be configured to retain in releasable mating engagement therewith a respective of the at least one stirring element 200. In an embodiment, the at least one stirrer seat 190 can be configured for retaining the attachment end 204 of stirring element 200 in releasable mating engagement therewith for supporting the respective stirring element 200 in relation to the cooking vessel interior. It will be understood that, in an embodiment, the at least one stirrer seat 190 can be magnetic for retaining attachment end 204 therein.

Lid 110 includes a set of gears 220 trained between the motor shaft 144 and the at least one stirrer seat 190 for driving rotation of the at least one stirrer seat 190 in relation to rotation of the motor shaft 144 upon controlled operation of electric motor 140. It will be understood that any suitable set of gears 220 can be used. The set of gears 220 reduces rotational speed of the at least one stirrer seat 190 relative to the motor shaft 144 of electric motor 140. In the embodiment illustrated in FIG. 3, the set of gears 220 includes a pinion gear 224 mounted in fixed relation to motor shaft 144 by being journaled in fixed relation thereto. The set of gears includes a gear transmission 228 having a set of trained gears thereof enmeshed with pinion gear 224 for reducing rotation by a suitable reduction ratio such as, for example, 1/360. The set of gears 220 includes a trained set of driven gears 232 enmeshed with gear transmission 228 for driving 305 rotation of the at least one stirrer seat 190. The set of gears 220 includes stirrer shaft gear 236 which is fixed to a respective driven stirrer shaft 238. Stirrer seat 190 is fixed to driven stirrer shaft 238 in spaced relation to stirrer shaft gear 236.

In an embodiment, the at least one circuit 164 can include at least one timer circuit (not shown) configured to affect a time period for current to be supplied from the at least one circuit 164 to the electric motor 140, or terminated. It will be understood that a beeper (not shown) associated with the at least one times circuit can be housed in the at least one cavity 134 to produce an audible sound for notifying a user that a period of time has ended.

In an embodiment, the at least one circuit 164 can include at least one stirring element speed control circuit configured to affect control of rotational speed of the electric motor 140 for controlling speed of the stirring elements 200.

In an embodiment, lid superstructure 114 can include a set of seals 115 configured to prevent moisture from contacting electrical components such as, for example, electric motor 140 and printed circuit board 160, which are housed in the at least one cavity 134.

In an embodiment, lid 110 can include a thermal sensor (not shown) supported by the lid superstructure 114 for exposure to the cooking vessel interior for measuring temperature therein. The thermal sensor can be in electrical communication with the at least one circuit for thermal sensor information to be obtained therefrom. It will be understood that a visual display can include a display of thermal sensor information such as, for example, temperature in the vessel interior.

According to embodiments, a system can include a cooking vessel and lid. It will be understood that a lid can have structure similar or identical to lid 110 described in the preceding paragraphs.

In other embodiments, the components of the lid 10, 110 described in the preceding paragraphs may be constructed of materials other than those listed. A device which will automatically stir food within a pot is a great convenience when preparing a meal, because it permits a person to attend to other matters while the food is being stirred. Automatic food stirrers of the prior art do not include various timed stirring functions which would be helpful. For example, it would be advantageous to set a device to automatically stir food within a pot constantly for a pre-determined period of time. It may also be advantageous to set the device to stir intermittently for a pre-determined period of time.

Automatic food stirrers of the prior art are not adjustable for use with various size pots. Generally, the food stirrer and the pot are available as one unit, made specifically to fit together. It would be advantageous to have a stirrer which could be applied to pots of various sizes. If a person has a need to automatically stir food within various sized pots, such a stirrer would provide a cost savings, because it would not be necessary to buy various sized stirrers in combination with various sized pots.

While the foregoing written description of the disclosed subject matter enables one of ordinary skill to make and use what is presently considered to be the best mode thereof, those of ordinary skill in the art will understand and appreciate the existence of variations, combinations, and equivalents of the specific embodiment, method, and examples herein. The invention should, therefore, not be limited by the above described embodiment, method, and examples, but by all embodiments and methods within the scope and spirit of the invention.

In certain embodiments, the lid may vary in diameter in order to fit pots of different diameters.

The terminology used herein is for the purpose of describing particular embodiments only and is not intended to be limiting. As used herein, the singular forms "a", "an", and "the" are intended to include the plural forms as well, unless the context clearly indicates otherwise. It will be further understood that the terms "comprises" and/or "comprising" or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

What is claimed is:

1. A lid configured for use with a cooking vessel, the cooking vessel having an outer wall including an upper lip, the cooking vessel having a vessel interior defined inside the outer wall, the lid comprising:
a lid superstructure, the lid superstructure comprising:
an outer peripheral portion configured to rest on the upper lip in seated relationship therewith, the lid superstructure having a bottom side proximate the vessel interior, the lid superstructure having a top side returning from the bottom side in opposed relationship thereto; an interior surface; and an exterior surface;
a handle, the handle removably coupled to the lid superstructure, the handle comprising:
an interior cavity;
an electric motor supported within the interior cavity;
a printed circuit board supported within the interior cavity, the printed circuit board comprising at least one circuit, the at least one circuit configured to deliver current to the electric motor, the at least one circuit configured for selectively controlling operation of the electric motor;
a circular platform held in association to the interior surface, the circular platform comprising a circular aperture, the circular aperture configured to receive a stirring element;
a power supply configured to deliver electric current to the at least one circuit;
at least one control switch supported by the handle, the at least one control switch connected to the at least one circuit to enable manual control of at least one control parameter of the at least one circuit;
a visual display supported by the lid superstructure, the visual display connected to the at least one circuit for displaying ~information about operation of at least two stirring elements;
at least two stirrer seats supported by the lid superstructure in spaced relationship to the outer peripheral portion of the lid superstructure for driven rotation relative to the lid superstructure, the at least two stirrer seats configured for driving engagement with respect to at least two stirring elements;
a set of gears connected between the electric motor and the circular platform, wherein actuation of the electric motor drives the circular platform and the stirring element connected thereto; and
at least two vents spaced within the lid superstructure, each of said at least two vents extending between the interior surface and the exterior surface for providing a path for water vapor or steam to escape from the vessel interior through the lid and into an external environment;
wherein the handle and the at least two vents are configured to prevent the interior cavity of the handle from receiving moisture exiting said at least to vents.

2. A lid according to claim 1 and further comprising:
the at least one control switch comprising at least one push-button control switch connected to the at least one circuit for incrementing the at least one control parameter.

3. A lid according to claim 1 and further comprising:
the at least one control parameter affecting current supplied from the at least one control circuit to the electric motor.

4. A lid according to claim 1 and further comprising:
the at least one control circuit comprising at least one timer circuit configured to affect a time period for current to be supplied from the at least one control circuit to the electric motor.

5. A lid according to claim 1 and further comprising:
the at least one control circuit comprising at least one stirring element speed control circuit configured to affect control of rotational speed of the electric motor.

6. A lid according to claim 1 and further comprising:
the set of gears comprising a pinion gear journaled to the motor shaft in fixed relationship to same.

7. A lid according to claim 6 and further comprising:
the set of gears comprising at least one driven gear entrained with the pinion gear, the at least one driven gear supported for rotation relative to the lid superstructure.

8. A lid according to claim 1 and further comprising:
a plurality of the at least two stirrer seats spaced about the lid superstructure;
a plurality of the set of gears, each trained between the motor shaft and respective of the plurality of the at least one stirrer seat for driving rotation of same in relation to rotation of the motor shaft.

9. A lid according to claim 1 and further comprising:
the at least two stirrer seats configured to retain in releasable mating engagement therewith respective of the at least two stirring elements.

10. A lid according to claim 9 and further comprising:
the respective of the at least stirring elements comprising an attachment end;
the at least two stirrer seats configured for retaining the attachment end in releasable mating engagement therewith for supporting the respective stirring elements in relation to the vessel interior.

11. A lid according to claim 1 and further comprising:
a set of seals configured to prevent moisture from contacting electrical components housed in the at least one cavity.

12. A lid according to claim 1 and further comprising:
the power supply comprising a battery connector housed in the at least one cavity, the battery connector configured for establishing an electrical connection with a battery replaceably positioned in the at least one cavity.

13. A lid according to claim 1 and further comprising:
the power supply comprising a power cord in electrical communication with the at least one circuit, the power cord at an end thereof having a plug configured to be received in a wall outlet of a fixed building electrical system.

14. A lid according to claim 1 and further comprising:
a thermal sensor supported by the lid superstructure for exposure to the vessel interior, the thermal sensor in electrical communication with the at least one circuit for thermal sensor information to be obtained therefrom;
the visual display comprising a display of thermal sensor information.

15. A system comprising a cooking vessel and lid according to claim 1.

16. A lid according to claim 1, wherein the at least two stirring elements comprise separate head configurations.

* * * * *